United States Patent [19]

Murayama et al.

[11] Patent Number: 4,953,220
[45] Date of Patent: Aug. 28, 1990

[54] MOBILE SPEAKER SYSTEM HAVING AN ILLUMINATION EFFECT

[75] Inventors: Fumio Murayama; Tomiaki Ando; Chuichi Endo, all of Yamagata, Japan

[73] Assignee: Pioneer Electronic Corporation, Tokyo, Japan

[21] Appl. No.: 175,796

[22] Filed: Mar. 31, 1988

[30] Foreign Application Priority Data

| Apr. 3, 1987 | [JP] | Japan | 62-50726[U] |
| Apr. 3, 1987 | [JP] | Japan | 62-50727[U] |
| Apr. 3, 1987 | [JP] | Japan | 62-50728[U] |

[51] Int. Cl.⁵ ............................................. H04B 1/00
[52] U.S. Cl. .................................... 381/86; 381/90; 381/205; 340/461; 340/326; 307/10.8
[58] Field of Search ................. 84/464 R, 464 A; 307/10 R, 10 LS, 10.8; 362/66–67, 71, 80, 74, 82, 94; 340/71, 74, 107, 110, 326, 340, 86, 88, 90, 460, 461, 521; 381/86, 88, 110, 90

[56] References Cited

U.S. PATENT DOCUMENTS

| 3,588,817 | 6/1971 | Gazzo | 340/94 |
| 3,603,195 | 9/1971 | Williams | 84/464 |
| 4,040,050 | 8/1977 | Nunn, Jr. | 340/405 |
| 4,149,141 | 4/1979 | Tamimura | 340/94 |
| 4,346,364 | 8/1982 | Takagi et al. | 340/460 |
| 4,348,655 | 9/1982 | Goertler et al. | 340/66 |
| 4,352,089 | 9/1982 | Yano et al. | 340/460 |
| 4,356,470 | 10/1982 | Kogawa et al. | 340/521 |
| 4,361,828 | 11/1982 | Hose | 340/107 |
| 4,438,422 | 3/1984 | Nojiri et al. | 340/460 |
| 4,559,584 | 12/1985 | Kuwahata et al. | 362/82 |
| 4,646,059 | 2/1987 | Iwamoto et al. | 340/461 |
| 4,667,177 | 5/1987 | Athalye | 340/66 |
| 4,734,697 | 3/1988 | Robinson et al. | 340/66 |

Primary Examiner—Forester W. Isen
Attorney, Agent, or Firm—Sughrue, Mion, Zinn, Macpeak & Seas

[57] ABSTRACT

A mobile speaker system including a speaker unit mounted in a speaker box, a plurality of light sources provided inside the speaker box for irradiating the illumination panel, and a switching circuit for controlling the light sources. The light sources emit light of a plurality of colors and are controlled by the switching circuit so as to be selectively turned on to irradiate the illumination panel.

10 Claims, 2 Drawing Sheets

MOBILE SPEAKER SYSTEM HAVING AN ILLUMINATION EFFECT

BACKGROUND OF THE INVENTION

The present invention relates generally to a mobile speaker system. More particularly, the invention relates to a mobile speaker system in which multi-colored illumination is provided and arranged to be controlled in connection with a brake lamp of a car.

Most mobile audio sets are mounted on passenger cars, and the speaker systems thereof are mounted on rear panels of the respective cars. There has been widely used a panel having characters, figures, etc., representing a trademark, a model number, etc., the panel being attached to the rear of the speakers and arranged so as to be irradiated with light from a light source to provide illumination. Such systems have become popular because of their pleasing appearance in the dark.

Recently, it has been proposed to use the illumination in such a mobile speaker system not only for its decorative effect but also functionally to indicate operations of the car, thereby adding value to the system. For example, a lamp can be provided in the mobile speaker system which is operated in connection with the brake system wherein the lamp is turned on in response to brake actuation to thus attract the attention of a following and aid in preventing rear-end collisions.

However, in order to provide both an illuminating effect and an operation display function in such a mobile speaker system, it has been necessary to provide two display devices. Hence, there has been a disadvantage in that the effectiveness of one of the two functions must be reduced due to the fact that a mobile speaker cabinet has little space for the provision of the two display devices.

Further, because the light must be turned on and off by the operator (driver), such mobile speaker systems are awkward to use.

Moreover, there has been a problem of a battery depletion if the light is inadvertently left on. In order to prevent such a problem, it is necessary to provide an indicator driver's seat. It has been difficult, however, to provide such an indicator at the because of the small amount of space available.

SUMMARY OF THE INVENTION

The present invention has been attained in view of the foregoing problems in the prior art.

A first object of the present invention is to provide a mobile speaker system with an illumination effect having an enhanced value.

In accordance with the above and other objects, in a mobile speaker system according to the present invention, that multi-color light sources are provided which irradiate an illumination panel with light of various colors to thereby employ the illumination panel as a multi-functional display. To this end, a mobile speaker system of the invention comprises a speaker unit mounted in a speaker box, light sources provided inside the speaker box for irradiating the illumination panel, and a switching circuit for controlling the light sources, the light sources being multi-color sources capable of producing light of a plurality of colors and being controlled by the switching circuit so as to be selectively turned on to irradiate the illumination panel.

Further, in order to attain the above and other objects of the present invention, the intentional mobile speaker system may be arranged such that the light source can be held in its on state a predetermined period of time after being turned off to prolong the illumination function. Alternatively, there may be additionally provided a car battery checking function. A system having such a battery checking function is arrange so that the light source is turned on to emit light of a specific color when a power source voltage of not higher than a predetermined value is detected.

DESCRIPTION OF THE PREFERRED EMBODIMENTS

Figure 1:
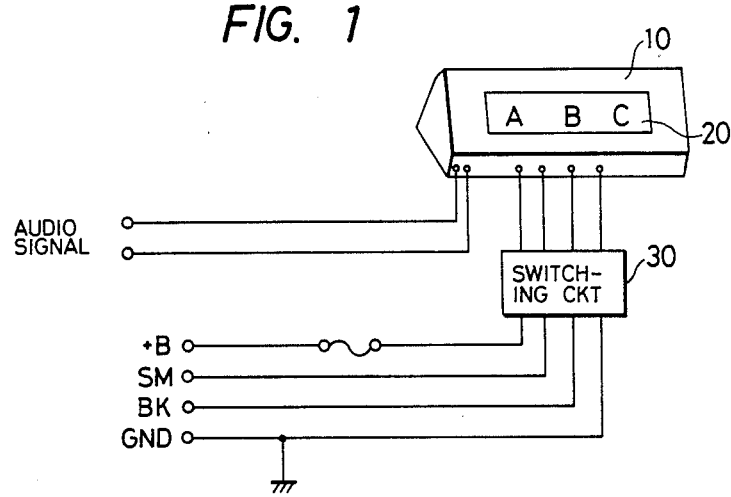
FIG. 1 is a diagram showing the general arrangement of a mobile speaker system according to the present invention.

Referring to the accompanying drawings, a preferred embodiment of the present invention will be described. FIG. 1 is a diagram showing a main part of a mobile speaker system constructed according to the present invention. In this drawing, an illumination panel 20 is attached to the back surface of a speaker box 10 in which is mounted a speaker unit (not shown) driven with an audio signal. The illumination panel 20 is made of a synthetic resin such as acrylic resin which allows light to pass therethrough. Characters, figures, etc., can be printed on the panel 20. A plurality of light sources for irradiating the illumination panel 20 are mounted within the speaker box 10 facing the illumination panel 20 to irradiate the latter with light of a plurality of colors. The light sources are controlled by a switching circuit 30 which is connected to an input terminal +B to which a power source (battery) for the light sources is applied, and input terminals SM and BK to which control signals are applied in response to the activation of a small lamp and a brake lamp of the car, respectively. Thus, a small lamp control signal and a brake lamp control signal actuate the illumination function and the operation display function, respectively, of the speaker system.

A power source (battery) voltage detection circuit 31 is connected to the switching circuit 30. When the power voltage drops to a predetermined value or less, a control signal is applied on a line which carries the brake lamp control signal.

In the present embodiment, the colors of light emitted by the light sources are blue and red, which are selectively actuated in response to the small lamp control signal and the brake lamp control signal applied to the switching circuit 30.

Figure 2:
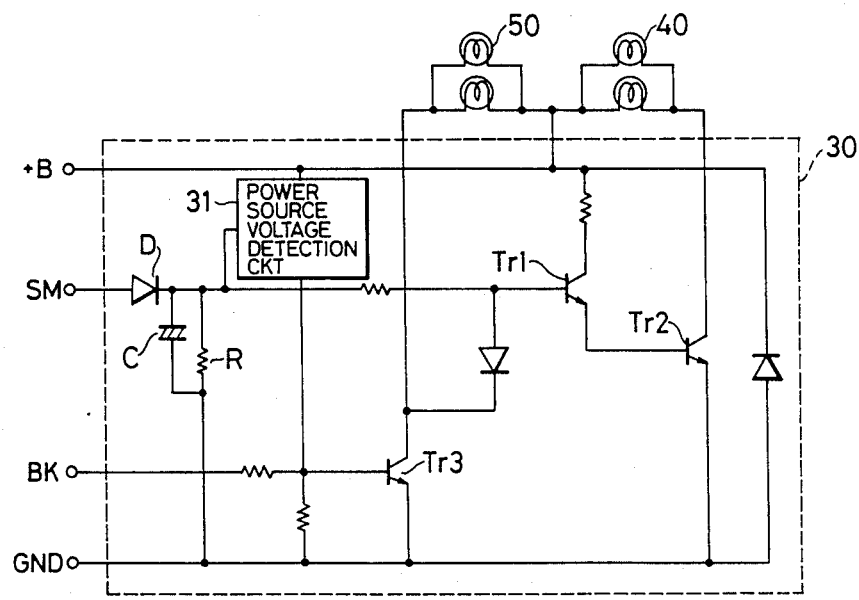
FIG. 2 is a diagram showing a specific arrangement of a switching circuit used in the present invention.

FIG. 2 is a diagram showing a specific arrangement of the switching circuit 30. In this drawing, there are provided a first light source 40 for emitting blue light and a second light source 50 for emitting red light. In each of the first and second light sources 40 and 50, plural light source elements are connected in parallel to each other. In FIG. 2, when a small lamp control signal is applied to the terminal SM in response to the activation of the small lamp, a voltage is supplied to the base of a transistor Tr1 through a diode D so that the transistor Tr1, and hence another transistor Tr2, are turned on and the power source voltage from the power source input terminal +B turns the light source 40 on to irradiate the illumination panel 20 with blue light. In this condition when the brake lamp is turned on when the brake pedal is depressed, a brake control signal is applied to the input terminal BK so that a transistor Tr3 is turned on during the period in which the brake control signal is being applied, thus turning the transistors Tr1 and Tr2 off to thereby turn the first and second light sources 40 and 50 off and on, respectively, at the same time. Thus, the light source 50 irradiates the illumination panel 20 in the red light. When the brake control signal is removed, the first light source 40 is turned on in response to the small lamp control signal. In this condition, if the small lamp switch is turned off, the small lamp control signal is removed. However, the transistor Tr1 is kept on for a predetermined time (off-timer time) which is determined by the time constant of a capacitance C and resistance R connected to the base of the transistor Tr1. Therefore, the first light source 40 continues in the on state during the off-timer time, and then is turned off.

Further, when the power voltage detection circuit 31 detects a drop in the source voltage, a control signal is supplied to the transistor Tr3 during the above-mentioned off-timer time to thereby turn the transistor Tr3 on so as to turn the second light source 50 on. Thus, when the second light source 50 is turned on to irradiate the illumination panel with red light, the display may be regarded as a checking display showing a drop in the battery voltage.

Figure 3:
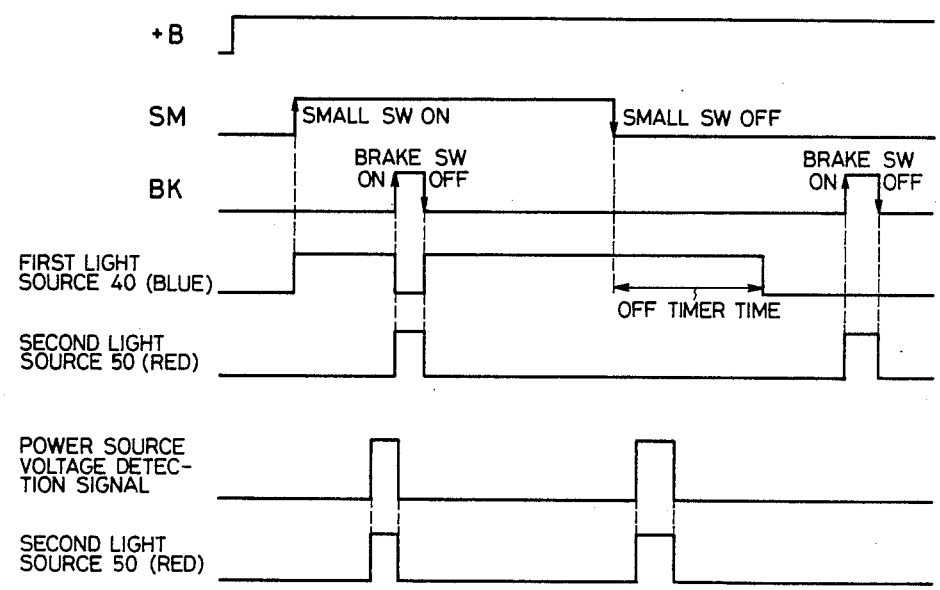
FIG. 3 is a timing chart showing the operation of the switching circuit shown in FIG. 2.

FIG. 3 is a timing chart of the above-mentioned operations.

Further, although in the above-described embodiment the first and second light sources 40 and 50 are arranged so as to be controlled by the switching circuit 30 so that a selected one of the light sources 40 and 50 is turned on, they may be arranged so that the illumination panel 20 is irradiated with a selected one of the light emitted by the first light source 40 and a mixture of light emitted by the first and second light sources 40 and 50 turned on at the same time.

Furthermore, although the switching circuit 30 is disposed outside the speaker box 10 in the above-described, the switching circuit 30 may be disposed inside the speaker box 10.

Moreover, the second light source 50 may be arranged so as to continue in the on state during the off-timer time in response to the turning off of the small lamp switch, rather than the first light source 40.

As is apparent from the above description, in the mobile speaker system according to the present invention, light sources are arranged so as to irradiate an illumination panel selectively with light of a plurality of colors to thereby make it possible to perform a plurality of functions in accordance with the irradiated colors to thus provide added value to the mobile speaker system.

Further, if the above-mentioned system is arranged on that the on state of the illumination is held for a predetermined period of time even after the turn-off operation as described above, the illumination function can be further enhanced.

Still further, since, in accordance with the present invention, a battery checking operation display function as well as the original illumination function can be performed, the added value is further increased.

What is claimed is:

1. A speaker apparatus mounted in a vehicle, said apparatus comprising:
   a speaker cabinet exteriorly mounted on a rear tray of said vehicle and having a panel to be illuminated attached to a rear surface thereof so as to be visible from behind said vehicle;
   an audio speaker, for reproducing sound mounted in said speaker cabinet;
   means for illuminating said panel with a plurality of colors for a decorative effect said illuminating means comprising a plurality of light sources mounted within said speaker cabinet; and
   means, connected to said illumination means, for selectively switching on and off said illumination means to illuminate said panel with selected colors in response to characteristics of said vehicle to indicate a function of said vehicle.

2. The speaker apparatus of claim 1, further comprising means for detecting a battery voltage of said vehicle, said illumination means illuminating said panel with a specific color when said detection means detects said battery voltage being equal to or less than a predetermined value.

3. The speaker apparatus of claim 1, further comprising means connected to said switching means for determining an off-timer time, said illuminating means illuminating said illumination panel for said off-timer time after said illumination means is turned off by said switching means.

4. The speaker apparatus of claim 3, wherein said off-timer time determining means comprises a capacitor and a resistor.

5. The speaker apparatus of claim 1, wherein said switching means is mounted inside said speaker cabinet.

6. The speaker apparatus of claim 1, wherein said vehicle includes:
   a power source for supplying a power source voltage;
   a small lamp; and
   a brake lamp.

7. The speaker apparatus of claim 6, wherein said switching means comprises:
   a first terminal to which said power source voltage is applied;
   a second terminal connected to said small lamp; and
   a third terminal connected to said brake lamp.

8. The speaker apparatus of claim 6, wherein said plurality of light sources include:
   a first light source of one color, selectively actuated in response to activation of said small lamp; and
   a second light source of another color, selectively actuated in response to activation of said small lamp; and 9. The speaker apparatus of claim 8, wherein when said first light source is turned on and when said brake lamp is subsequently activated, the first and second light sources are turned off and on, respectively, at the same time.

10. The speaker apparatus of claim 8, further comprising means connected to said switching means for determining an off-timer time, said first light source remaining actuated for said off-timer time after said small lamp is deactivated.

* * * * *